(No Model.) 2 Sheets—Sheet 2.
J. SINDELAR.
MOWING MACHINE.
No. 494,900. Patented Apr. 4, 1893.
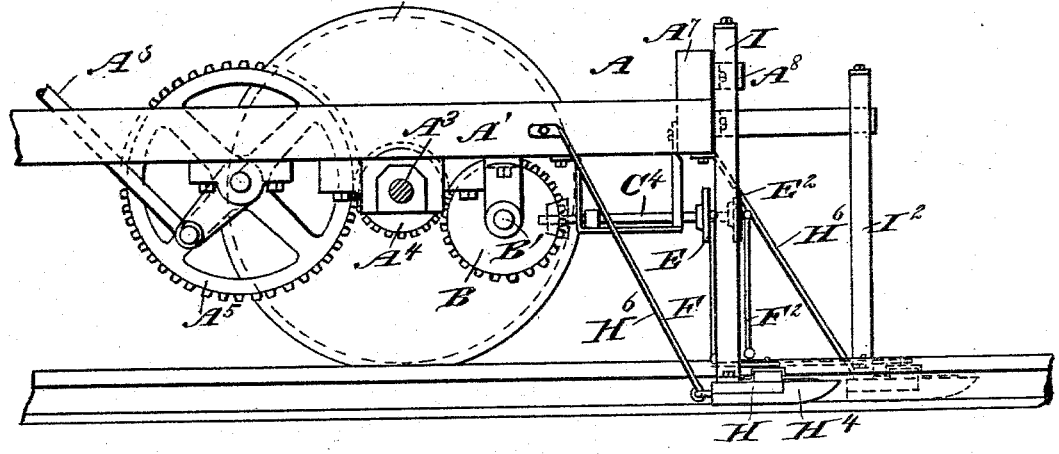
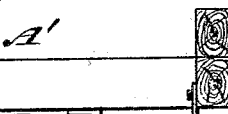
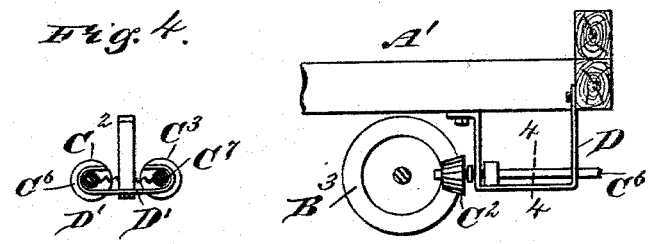
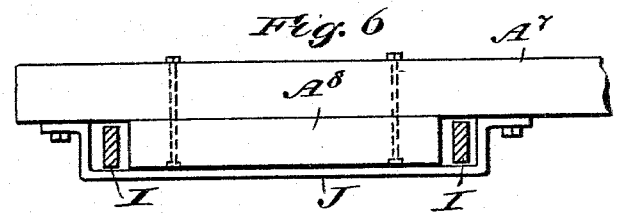
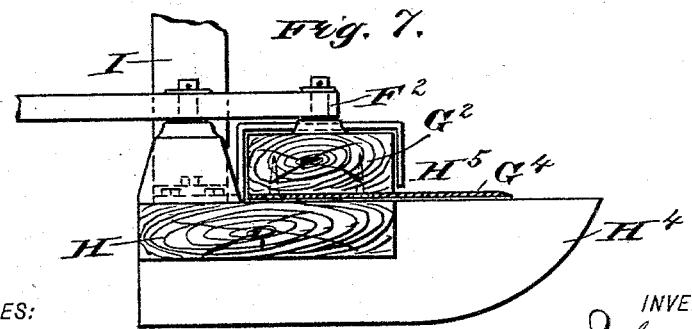
WITNESSES:
J. A. Bergstrom
C. Sedgwick
INVENTOR
J. Sindelar
BY Munn & Co
ATTORNEYS.

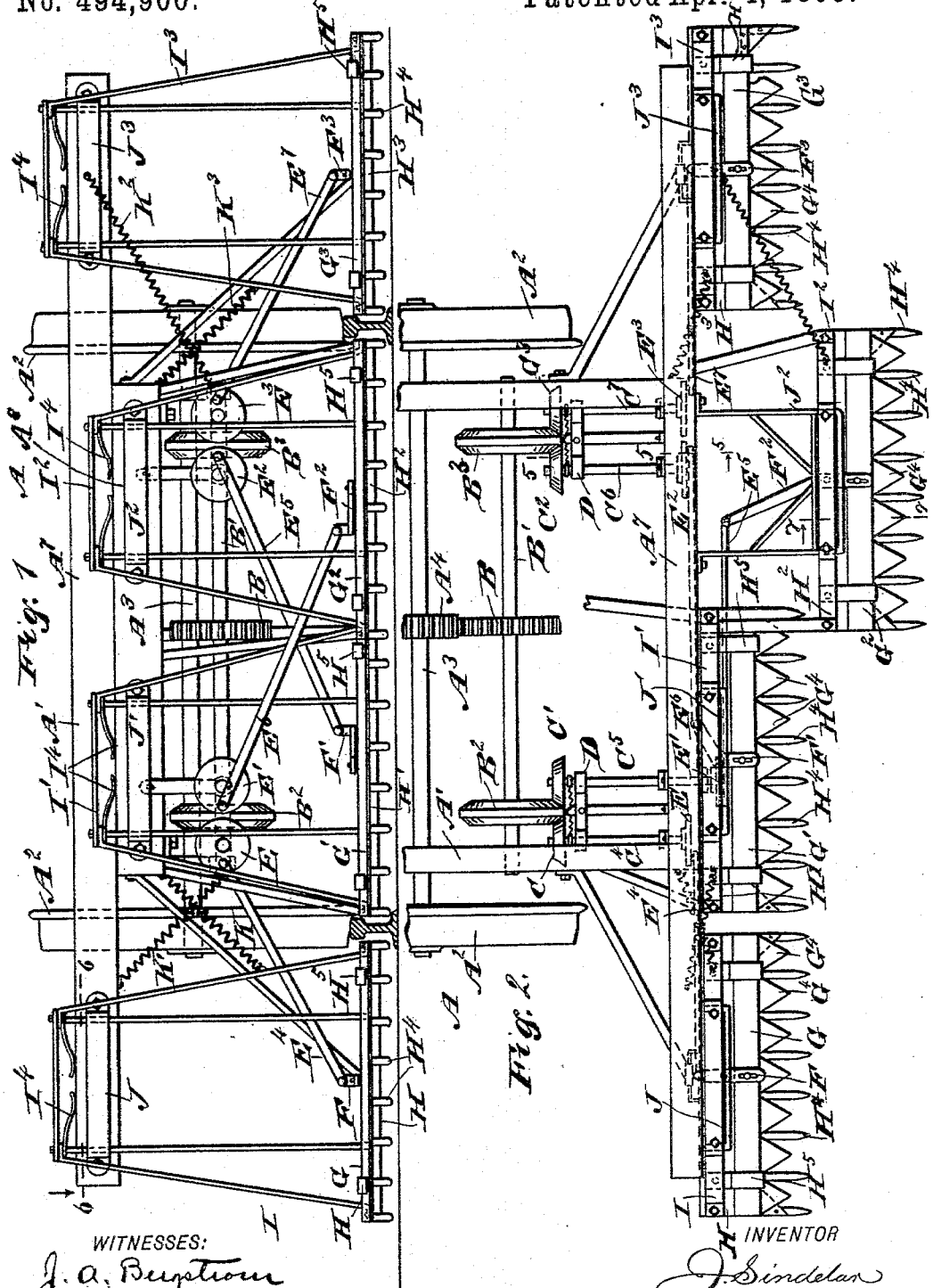

UNITED STATES PATENT OFFICE.

JOSEPH SINDELAR, OF IPSWICH, SOUTH DAKOTA.

MOWING-MACHINE.

SPECIFICATION forming part of Letters Patent No. 494,900, dated April 4, 1893.

Application filed October 3, 1892. Serial No. 447,713. (No model.)

*To all whom it may concern:*

Be it known that I, JOSEPH SINDELAR, of Ipswich, in the county of Edmunds and State of South Dakota, have invented a new and Improved Mowing-Machine, of which the following is a full, clear, and exact description.

The object of the invention is to provide a new and improved mowing machine, which is simple and durable in construction, and particularly designed for use on railroads to conveniently and rapidly cut the weeds growing on the track inside and outside of the rails.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a front elevation of the improvement. Fig. 2 is a plan view of the same. Fig. 3 is a side elevation of the same. Fig. 4 is a sectional front view of the bearings on the line 4—4 of Fig. 5. Fig. 5 is a sectional side elevation of part of the transmitting mechanism on the line 5—5 of Fig. 2. Fig. 6 is an enlarged sectional plan view of the improvement on the line 6—6 of Fig. 1; and Fig. 7 is an enlarged transverse section of one of the cutting mechanisms on the line 7—7 of Fig. 2.

The improved mowing machine is preferably mounted on the front end of a hand car A, of any approved construction, and provided with the usual truck $A'$, wheels $A^2$ traveling on the rails, and secured on an axle $A^3$ journaled in the truck $A'$ and provided with a gear wheel $A^4$ in mesh with a larger gear wheel $A^5$ connected by a pitman $A^6$ with the mechanism actuated by the parties on the car to propel the latter forward. The gear wheel $A^4$ is in mesh with a gear wheel B secured on a shaft $B'$ extending transversely and journaled in the forward end of the truck $A'$. On this shaft $B'$ are secured two double bevel gear wheels $B^2$ and $B^3$ of which the double bevel gear wheel $B^2$ is in mesh with the two bevel gear wheels C and $C'$, and the other double bevel gear wheel $B^3$ is in mesh with the two bevel gear wheels $C^2$ and $C^3$. The bevel gear wheels C, $C'$, $C^2$ and $C^3$, are secured on the inner ends of longitudinally-extending shafts $C^4$, $C^5$, $C^6$ and $C^7$ respectively, yieldingly mounted in bearings D supported from the truck $A'$. The forward ends of the shafts $C^4$, $C^5$, $C^6$ and $C^7$ carry the crank disks E, $E'$, $E^2$ and $E^3$ respectively, connected by pitmen $E^4$, $E^5$, $E^6$ and $E^7$ respectively, with horizontally-extending levers F, $F'$, $F^2$ and $F^3$ respectively, pivotally-connected at their outer ends with the sickle bars G, $G'$, $G^2$ and $G^3$ respectively, each carrying the usual knives $G^4$ operating over the finger guards $H^4$, of the finger bars H, $H'$, $H^2$ and $H^3$ respectively. The sickle bars G, $G'$, $G^2$ and $G^3$ are mounted to slide in bearings $H^5$ supported on the finger bar H, $H'$, $H^2$ and $H^3$ respectively, and the several bars are supported on upwardly-extending frames I, $I'$, $I^2$ and $I^3$ respectively, held in keepers or guideways J, $J'$, $J^2$ and $J^3$ respectively, supported from a transverse beam $A^7$ secured to the forward end of the car truck $A'$. Each of the frames I, $I'$, $I^2$ or $I^3$ is provided with springs $I^4$ which rest on a bar $A^8$ held on the beam $A^7$ and extend over the respective keeper J, $J'$, $J^2$ or $J^3$, the said springs permitting a yielding motion of the frames I, $I'$, $I^2$ and $I^3$ and the parts supported thereon so that the finger bars and fingers can readily pass over obstructions in the track without danger to the fingers or knives. The frames I, $I'$, $I^2$ and $I^3$ are also adapted to slide sidewise in the respective keepers J, $J'$, $J^2$ and $J^3$, and are held in a normal position by springs K, $K'$, $K^2$ and $K^3$, arranged in such a manner that the springs K and $K^3$ pull the frames I and $I^3$ respectively, inwardly to hold the inner end of the guide bars H and $H^3$ respectively, in contact with the outer side of the rails, as will be readily understood by reference to Figs. 1 and 2. In a like manner the other springs $K'$ and $K^2$ pull the frames $I'$ and $I^2$ outwardly, to hold the outer ends of the guard bars $H'$ and $H^2$ in contact with the inner surfaces of the rails. As will be seen by reference to Fig. 2, the frame $I^2$ with the parts supported thereon, is arranged somewhat in front of the other frames, so that it has a movement independent of the frame $I'$ and does not interfere with the latter, when either of the two swing sidewise. The inner ends of the guard bars $H'$ and $H^2$ and their sickle bars overlap slightly, so that all the weeds growing between the rails will be cut without leaving a streak in the center between the rails. The guard bars H H', H² and H³ are also hung on braces H⁶ extending in an inclined position rearwardly and upwardly to connect with the truck A' of the hand car A. The connection between the braces and the guard bars is preferably pivotal so as to permit a sidewise swinging or an up and down movement of the bars and their frames, as above mentioned.

The operation is as follows: When the several parts are in the position illustrated in the drawings and the hand car A is propelled forward in the usual manner on the rails, then the rotary motion of the axle A³ causes a like motion of the shaft B' by the gear wheel of the latter meshing into the gear wheel A⁴ of the said axle. The rotary motion of the shaft B' is transmitted to the several longitudinally-extending shafts C⁴, C⁵, C⁶ and C⁷ by the bevel gear wheels C, C', C² and C³, meshing into the double bevel gear wheels B² and B³ on the said shaft B'. The crank disks E, E', E² and E³ on the revolving shafts C⁴, C⁵, C⁶ and C⁷ together with the pitmen E⁴, E⁵, E⁶ and E⁷, and the levers F, F', F², and F³ impart a reciprocating motion to the sickle bars G, G', G² and G³, so that their knives G⁴ cut the weeds passing between the finger guards H⁴ of the several guard bars H, H', H² and H³.

It will be seen that by the arrangement of the several independent cutting mechanisms above described, the weeds are cut inside of the rails and outside of the same, on the forward movement of the hand car.

It is further understood that two cutting mechanisms are arranged between the rails and one of the cutting mechanisms is located in front of the other, so that each has its own independent yielding motion, both sidewise or up and down, so as to pass over obstructions in the track or over fish plates on the rails or other obstructions, without one interfering with the other.

As illustrated in Fig. 4, the several shafts C⁴, C⁵, C⁶ and C⁷ are pressed on by springs D', so that the shafts are yieldingly mounted in their bearings, to permit the irregular movement of the frames carrying the sickle bars, without any danger of breaking the connection between the shafts and the double bevel gear wheels, at the same time holding the gear wheels in mesh.

Having thus fully described my invention, I claim as new and desire to secure by Letters Patent—

1. A mowing machine provided with a vertically sliding spring supported frame carrying the cutting mechanism at its lower end, and a yielding shaft geared to the drive shaft and connected with the cutting mechanism, substantially as set forth.

2. A weed mower for railroads provided with sets of independent cutting mechanisms having a vertically and also a laterally yielding movement away from the rails and of which mechanisms two are arranged between the tracks and located one in front of the other, and two are arranged outside of the tracks, substantially as shown and described.

3. A mowing machine provided with a cutting mechanism mounted to slide up and down and to yield sidewise, substantially as shown and described.

4. A mowing machine provided with a cutting mechanism comprising a frame yieldingly mounted to slide up and down and sidewise, a guard bar secured on the said frame and provided with guard fingers, and a sickle bar carrying knives and mounted to slide on the said guard bar, substantially as shown and described.

5. A mowing machine provided with a cutting mechanism comprising a frame yieldingly mounted to slide up and down and sidewise, a guard bar secured on the said frame and provided with guard fingers, a sickle bar carrying knives and mounted to slide on the said guard bar, and means, substantially as described, for imparting a reciprocating motion to the said sickle bar, as set forth.

6. A mowing machine provided with a cutting mechanism comprising a frame, a keeper in which the said frame is fitted to slide vertically and sidewise, springs for supporting the said frame in a vertical position, a spring for holding the frame in a normal sidewise position, a guard bar carried by the said frame and provided with guard fingers, and a sickle bar mounted to slide on the said guard bar and carrying knives, substantially as shown and described.

7. In a mowing machine, the combination with a hand car, a series of independent cutting mechanisms yieldingly mounted on the said hand car at the front end thereof, of separate and independent shafts, for imparting a reciprocating motion to the sickle bars of the said cutting mechanisms from the axle of the said hand car and springs permitting said shafts to yield with the cutting mechanism, substantially as shown and described.

JOSEPH SINDELAR.

Witnesses:
A. H. BIRD,
J. A. WILLIAMS.